Dec. 17, 1935.　　　F. C. THOMPSON　　　2,024,486
CLUTCH
Filed May 8, 1934　　　2 Sheets-Sheet 1

INVENTOR
Fred C. Thompson
BY
Synnestvedt + Lechner
ATTORNEYS

Dec. 17, 1935.  F. C. THOMPSON  2,024,486
CLUTCH
Filed May 8, 1934    2 Sheets-Sheet 2

INVENTOR.
Fred C. Thompson
BY
Synnestvedt + Lechner
ATTORNEYS.

Patented Dec. 17, 1935

2,024,486

UNITED STATES PATENT OFFICE 2,024,486

CLUTCH

Fred C. Thompson, Detroit, Mich., assignor to Morse Chain Company, Ithaca, N. Y., a corporation of New York Application May 8, 1934, Serial No. 724,466

9 Claims. (Cl. 192—45.1)

This invention relates to improvements in clutches of the type in which clutch engagement and disengagement is effected through relative rotative movement between driving and driven rotating members to be clutched together, an example of which is found in the patent to J. Keller, Sr., #1,610,794, patented December 14, 1926.

One of the primary objects of my invention is to provide an improved clutch of the above type having capacity to transmit very heavy loads and in which certain difficulties heretofore experienced with respect to the action of the clutching elements when transmitting such heavy loads are overcome.

Other objects have to do with improvements in the cam or eccentric pawl means employed in clutches of the above type whereby very heavy loads may be transmitted through the coupling and whereby the load is effectively distributed among the plurality of cam or eccentric pawl devices employed in the clutch.

It is also an object of my invention to provide improvements in the cam means and operating member therefor adapted to relieve the gear teeth thereof of drive torque and crushing stresses. More specifically stated, I provide these parts with contacting surfaces adapted to relieve the gear teeth of stresses to which they were subjected in prior constructions.

Other objects have to do with improvements in certain details of construction which will become apparent as the description of the invention proceeds.

How the foregoing together with such other objects and advantages as may hereinafter appear or are incident to my invention are realized, is illustrated in preferred form in the accompanying drawings, wherein—

Figure 1:
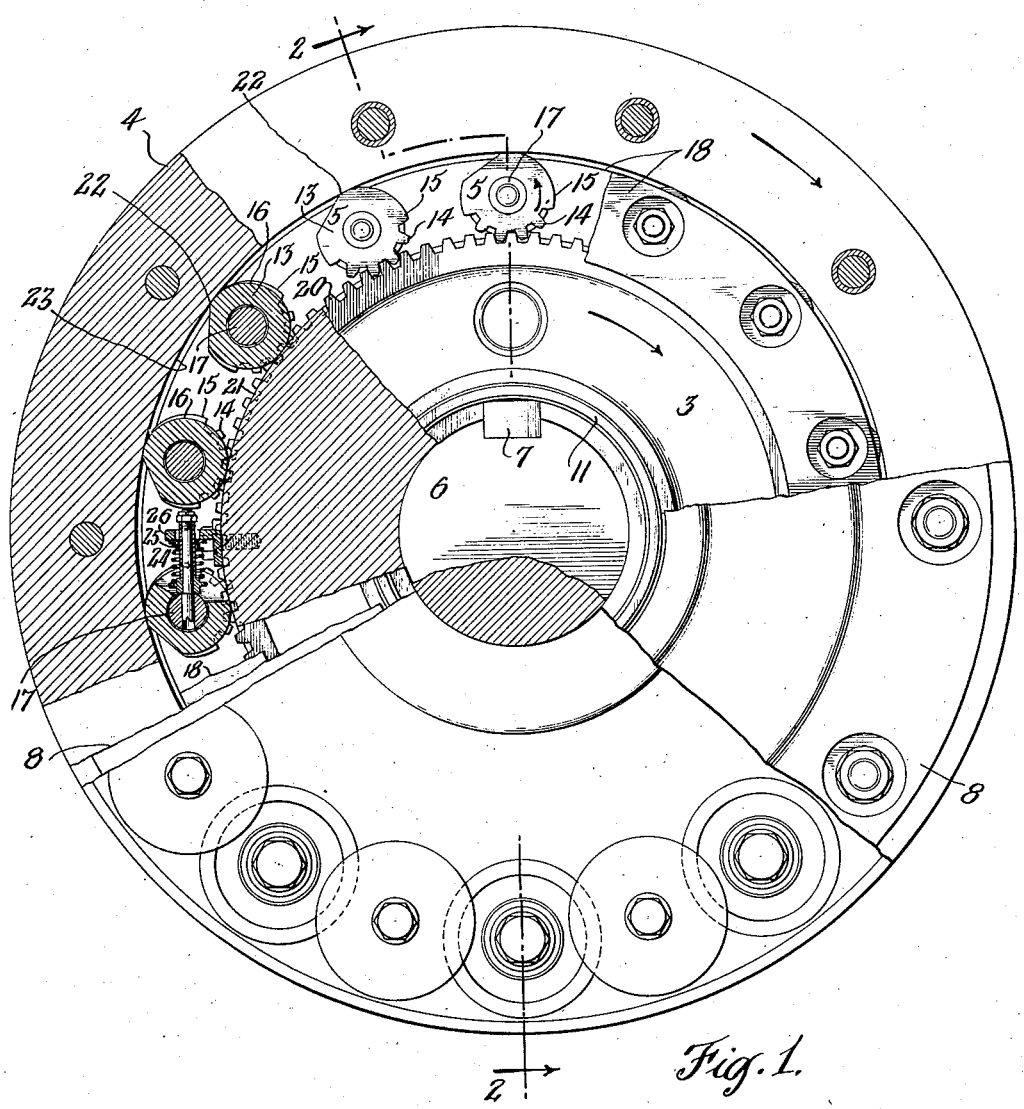
Figure 2:
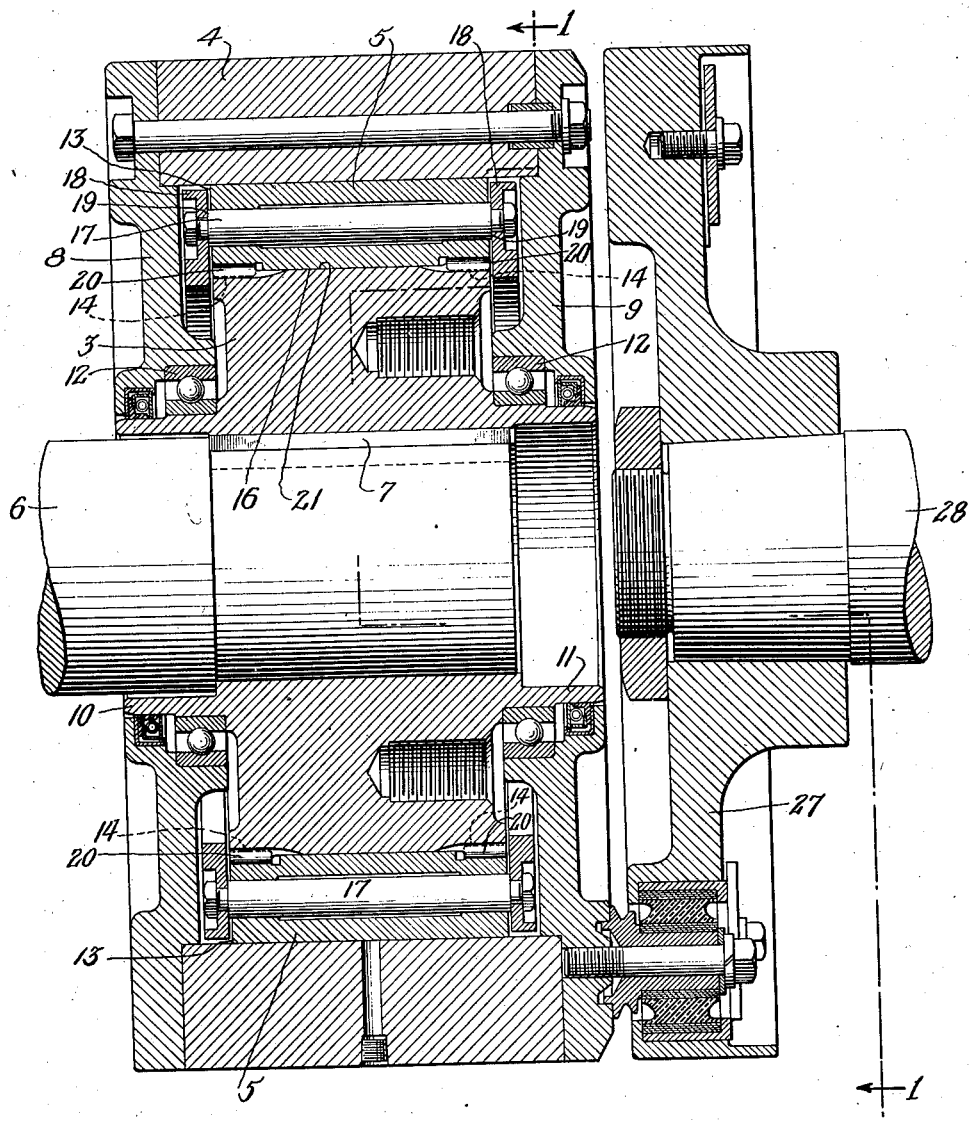

Fig. 1 is a face view of a coupling constructed in accordance with my invention in which certain parts are broken away to clearly show the construction of other parts, with the line 1—1 in Fig. 2 approximately indicating how the various portions of the view are taken; and Fig. 2 is a cross section through the coupling taken substantially on the line 2—2 of Fig. 1 with certain parts appearing in elevation.

My improved clutch comprises in general a pair of rotatable members 3 and 4 with means in the form of cam or eccentric pawl devices 5 therebetween, operable to clutch them together for drive. In this instance the member 3 is the driving member of the clutch and is secured on the shaft 6 of an associated driving device as by means of a key 7, and the member 4 is a driven member adapted to be connected to a device to be driven.

The driven member 4 is mounted in spaced encircling or surrounding relation to the driving member 3 and is maintained accurately concentric with the driving member by means of end plates or wall portions 8 and 9 secured to the driven member and having bearing on end hubs 10 and 11 of the driving member. Antifriction bearings 12 may be provided between the hubs and end plates.

The plurality of cam devices 5 are located in the annular space between the driving and driven members for the purpose of effecting clutch engagement and disengagement. Each of these devices comprises a generally cylindrical member 13 having its end portions provided with gear teeth 14 and eccentric cam portions 15 and having a central cylindrical portion 16. These members are mounted with running clearance on rods 17, carried by a pair of rings 18 which are spaced apart a distance slightly greater than the length of the members 13 by means of shoulders 19 on the rods whereby the members may rotate freely on the rods. The rods are equally spaced circumferentially of the rings and the number thereof may be varied as desired.

The pitch circle of the gear teeth 14 is concentric with the rod 17 and the diameter of the central portion 16 is equal to the pitch diameter of the gear teeth. The cam surfaces of the cam portions 15 are struck from centers downwardly offset from the centers of the members so as to provide cams having their high points coinciding with the tops of the gear teeth and their low points coinciding with the pitch diameter of the teeth as will be seen from Fig. 1, it being noted that the gear teeth are at the lower portion of the members and the cams at the upper portions.

The teeth 14, mesh with external gear teeth 20 provided adjacent the side faces of the driving member 3 and the central cylindrical portions 16 engage the cylindrical surface 21 of the driving member which is of a diameter equal to the pitch diameter of the gear teeth 20.

In assembling the clutch, the teeth of the cam devices are meshed with the teeth of the driving member in the manner illustrated in Fig. 1 so that the low points 22 of the cams are in light contact or slightly spaced relation to the inner curved surface 23 of the driven member 4 and in which position the clutch is disengaged.

Assuming now that the mechanism with which the clutch is associated is put into operation and the driving member 3 rotated in the direction of the arrow shown in Fig. 1, this will impart rotary movement to the cam devices 5 in the opposite direction with the result that the cams engage the inner surface of the driven member 4 with a wedging action and effect clutch engagement, thus causing the driving and driven members to rotate together.

In order to prevent the driving member and the cam devices from rotating together without effecting clutch engagement, as might be caused by lubricant between the cam surfaces and the cooperating surface 23 of the driven member, I provide a device or devices 24 adapted to bring the eccentric part of the cams into contact with the driven member and comprising spring means 25 reacting from a member 26, carried by the driving member 3 and pressing against the rod 17 of an adjacent cam device to effect rotative movement to the rings 18 which results in positively moving the cam devices toward locking or clutch engaging position.

With reference to the gear teeth of the cam devices and of the driving member, it is pointed out that these are so cut that there is back lash therebetween and since the cylindrical surfaces 16 of the cam devices and the cylindrical surface 21 of the driving member 3 are in rolling contact, it will be seen that the gear teeth are relieved of drive torque and crushing stresses in operation.

Furthermore, since the gear teeth have back lash and the stresses are taken by the contacting surfaces 16 and 21, any slight inaccuracies in the circumferential spacing of the cam devices in the rings 18 are taken care of because due to back lash, the cams which are not accurately located would not be rotated into a position causing their eccentric cam surfaces to grip the driven member. In this connection, it is pointed out that if the gear teeth were in actual contact and directly took the load as in prior constructions, any such inaccuracies would cause the mis-located cam devices to be rotated into contact while the others would be out of contact. Also, if certain of the gear teeth become distorted, for example in hardening, only certain of the cams would be in proper contact with the driven member and these would have to take all of the stresses and directly through the gear teeth. Furthermore, when employing gear teeth of a small pitch diameter on the cam gears for mesh with a gear of much larger diameter the tooth contact is by means of one tooth which causes a tendency for the cam device to rise and fall slightly when rotating from one tooth to another and therefore unless the location of the teeth of one cam device to the others is in perfect accuracy, the condition of having only part of the cam device carry the load will exist. In my improved arrangement, such difficulties are overcome because of the contacting surfaces referred to and the back lash between the gears. When the driving member is rotated in a direction opposite to that indicated by the arrow in Fig. 1, the cams are quickly thrown out of engagement with the driven member and the clutch becomes disengaged. Such disengagement also takes place as in free wheeling when the speed of the driven member overruns the speed of the driving member.

In the particular arrangement illustrated in the drawings, I have shown a flexible coupling 27 located between the driven member of the clutch and the shaft 28 of the device to be driven.

It will be seen from the foregoing that I have provided an improved clutch of the type referred to which is adapted to transmit very heavy loads and in which the stresses are evenly distributed over the plurality of cam devices through actual contacting cylindrical surfaces which may be accurately ground to size, located at the pitch diameters of the gears and not through the gear teeth themselves, in which inaccuracies may occur. Another factor which has to do with the effective functioning of my improved clutch resides in being enabled to provide accurately ground surfaces after hardening.

I claim:

1. A clutch comprising a rotatable driving member, a rotatable driven member in spaced surrounding relation to said driving member, cam members in the annular space between said members, said cam members having a cam surface, an adjacent cylindrical surface, and gear teeth, gear teeth on one of said rotatable members, meshing with the gear teeth of the cam members, a cylindrical surface on the other of said rotatable members engageable by the cam surfaces of the cam members to clutch the rotatable members together for drive, and a cylindrical surface on the toothed rotatable member engageable with the cylindrical surfaces of the cam members to relieve the gear teeth of wedging and crushing stresses.

2. A clutch comprising a rotatable driving member, a rotatable driven member in spaced surrounding relation to said driving member, cam members in the annular space between said members, said cam members having a cam surface, gear teeth, and a cylindrical surface of a diameter equal to the pitch diameter of the gear teeth thereon, external gear teeth on the driving member meshing with the teeth of the cam members, a cylindrical surface on said driving member of a diameter equal to the pitch diameter of the gear teeth thereon, said cylindrical surfaces riding in contact to relieve the gear teeth of wedging and crushing stresses.

3. A clutch comprising a pair of rotatable members, means for clutching said members together comprising cam members therebetween, meshing gear teeth on one of said rotatable members and on the cam members, a cylindrical surface on the other rotatable member adapted to be engaged by the cam surfaces of said cam members, and contacting cylindrical surfaces on said toothed member and on said cam members struck at the pitch lines of the gear teeth thereof.

4. A clutch comprising a pair of rotatable members, means for clutching said members together comprising cam members therebetween, external gear teeth on said cam members, external gear teeth on one of said rotatable members meshing with the gear teeth of the cam members whereby rotation of said toothed rotatable member imparts rotating movement to said cam members, a cylindrical surface on said toothed rotating member having a diameter equal to the pitch diameter of the teeth of said member, cylindrical surfaces on said cam members adjacent the cam surfaces thereof and having a diameter equal to the pitch diameter of the gear teeth of said cam members, said cylindrical surfaces being in contact and said meshing teeth having back lash.

5. A clutch comprising a driving member having external gear teeth and an adjacent cylindrical surface, the diameter of which equals the pitch diameter of said gear teeth, a cam member having external gear teeth, a cam surface and an adjacent cylindrical surface the diameter of which equals the pitch diameter of the gear teeth of the cam member, and a driven member having an internal circular surface adapted to be engaged by the cam member, said cam member being positioned in camming relation to said internal surface with its cylindrical surface contacting with said cylindrical surface of the driving member and with its gear teeth meshing with those of the driving member.

6. A clutch comprising a driving member having two spaced sets of external gear teeth and a cylindrical surface between said sets of teeth, the diameter of which equals the pitch diameter of the sets of gear teeth, cam means having two sets of external gear teeth spaced to correspond to the spacing of the gear teeth of said driving member and having a cylindrical surface between said sets of teeth, the diameter of which equals the pitch diameter of said sets of gear teeth, and a driven member having an internal surface adapted to be engaged by the cam means, said cam means being positioned in camming relation to said internal surface with its cylindrical surface contacting with said cylindrical surface of the driving member and with its sets of gear teeth meshing with the sets of gear teeth of the driving member.

7. A clutch comprising a driving member having external gear teeth, cam means having external teeth meshing with the teeth of the driving member, a driven member having an internal surface in spaced concentric relation to the driving member adapted to be engaged by said cam means, and means at the pitch lines of the teeth on said driving member and cam means for relieving said gear teeth of wedging and crushing stresses.

8. A clutch comprising a driving member having external gear teeth, cam means having external teeth meshing with the teeth of the driving member, a driven member having an internal surface in spaced concentric relation to the driving member adapted to be engaged by said cam means, and contacting cylindrical surfaces at the pitch lines of the teeth on said driving member and cam means for taking wedging and crushing loads.

9. A clutch comprising a pair of rotatable members, means for clutching said members together, comprising floating rings and cam means carried thereby, located between the rotatable members, meshing gear teeth on one of said members and on the cam means, said teeth being cut to have back lash, a surface on the other member engageable by the cam means to clutch the members together for drive, and contacting cylindrical surfaces on said toothed member and on said cam means struck at the pitch lines of the gear teeth thereof.

FRED C. THOMPSON.